(12) United States Patent
Saeki et al.

(10) Patent No.: US 7,296,558 B2
(45) Date of Patent: Nov. 20, 2007

(54) DUAL-INJECTOR FUEL INJECTION ENGINE

(75) Inventors: Tetsuya Saeki, Toyota (JP); Shizuo Abe, Aichi (JP); Tomihisa Tsuchiya, Toyota (JP); Terutoshi Tomoda, Mishima (JP); Shinichi Kurosawa, Iwata (JP); Masaki Katou, Iwata (JP); Akira Yamaguchi, Fukuroi (JP); Yuichi Suzuki, Iwata (JP)

(73) Assignees: Yamaha Hatsudoki Kabushiki Kaisha, Shizuoka-ken (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 11/378,115

(22) Filed: Mar. 17, 2006

(65) Prior Publication Data

US 2006/0207527 A1 Sep. 21, 2006

(30) Foreign Application Priority Data

Mar. 18, 2005 (JP) .............................. 2005-079861

(51) Int. Cl.
*F02B 1/00* (2006.01)

(52) U.S. Cl. ...................................... 123/431; 123/299

(58) Field of Classification Search ................ 123/299, 123/431

See application file for complete search history.

(56) References Cited

U.S. PATENT DOCUMENTS 3,998,614 A   12/1976  Schonberger et al.
4,257,375 A   3/1981   Ulrich
4,373,491 A   2/1983   Knapp
4,526,152 A   7/1985   Hideg et al.
4,694,808 A   9/1987   Peters
4,926,821 A   5/1990   Porth et al.
5,094,210 A   3/1992   Endres et al.
5,251,582 A   10/1993  Mochizuki
5,265,562 A   11/1993  Kruse
5,460,128 A   10/1995  Kruse
5,566,650 A   10/1996  Kruse
5,608,632 A   3/1997   White (Continued)

FOREIGN PATENT DOCUMENTS

DE          37 07 805         9/1987

(Continued)

OTHER PUBLICATIONS

PCT International Search Report, PCT/JP2006/302628, Apr. 14, 2006.

(Continued)

*Primary Examiner*—Erick Solis
(74) *Attorney, Agent, or Firm*—Knobbe Martens Olson & Bear LLP

(57) ABSTRACT

A dual-injector fuel injection engine includes a cylinder block, a cylinder head, an intake port, an intake manifold, a surge tank, an in-cylinder injector, an intake pipe injector, and first and second delivery pipes. The in-cylinder injector is positioned below the intake port, when seen from an axial direction of a crank shaft, and attached to the cylinder head. The intake pipe injector and the second delivery pipe are supported above the intake port, when seen from the axial direction of the crank shaft, by the intake manifold to be close to the intake port.

17 Claims, 9 Drawing Sheets

U.S. PATENT DOCUMENTS

| | | |
|---|---|---|
| 5,694,902 A | 12/1997 | Miwa et al. |
| 5,894,832 A | 4/1999 | Nogi et al. |
| 5,924,405 A | 7/1999 | Hashimoto |
| 6,024,064 A | 2/2000 | Kato et al. |
| 6,039,029 A | 3/2000 | Nagasaka et al. |
| 6,058,904 A | 5/2000 | Kruse |
| 6,192,857 B1 | 2/2001 | Shimada |
| 6,340,014 B1 | 1/2002 | Tomita et al. |
| 6,405,704 B2 | 6/2002 | Kruse |
| 6,467,465 B1 | 10/2002 | Lorts |
| 6,539,923 B1 | 4/2003 | Mengoli |
| 6,637,406 B2 * | 10/2003 | Yamada et al. ............. 123/431 |
| 6,647,465 B2 | 11/2003 | Kametani et al. |
| 6,662,777 B2 | 12/2003 | Tsuchiya |
| 6,827,064 B2 | 12/2004 | Akagi et al. |
| 6,843,219 B2 | 1/2005 | Matsuda et al. |
| 6,959,693 B2 * | 11/2005 | Oda ........................... 123/431 |
| 6,961,651 B2 | 11/2005 | Oshima |
| 7,013,874 B2 | 3/2006 | Kurayoshi et al. |
| 7,063,070 B2 * | 6/2006 | Mashiki ..................... 123/299 |
| 7,082,927 B2 | 8/2006 | Miyashita |
| 7,121,261 B2 | 10/2006 | Kinose |
| 2001/0027776 A1 | 10/2001 | Amou et al. |
| 2001/0047794 A1 | 12/2001 | Kato |
| 2004/0007209 A1 | 1/2004 | Ohtani |
| 2005/0205067 A1 | 9/2005 | Koide et al. |
| 2006/0207555 A1 | 9/2006 | Ito et al. |
| 2006/0207567 A1 | 9/2006 | Yamaguchi et al. |
| 2006/0212208 A1 | 9/2006 | Uchida et al. |

FOREIGN PATENT DOCUMENTS

| | | |
|---|---|---|
| EP | 0 169 481 A | 1/1986 |
| EP | 1030048 A2 | 8/2000 |
| EP | 1 096 138 A2 | 5/2001 |
| EP | 1 096 138 A3 | 5/2001 |
| EP | 1 293 653 | 3/2003 |
| EP | 1 387 081 A2 | 2/2004 |
| EP | 1 396 633 A2 | 3/2004 |
| EP | 1 533 518 A1 | 5/2005 |
| GB | 2 009 843 A | 10/2001 |
| JP | 49-081719 | 8/1974 |
| JP | 63-098479 | 6/1988 |
| JP | 63-138119 | 6/1988 |
| JP | 01-240765 | 9/1989 |
| JP | 03-015622 | 1/1991 |
| JP | 03-275978 | 12/1991 |
| JP | 7-247924 | 9/1995 |
| JP | 07-269394 | 10/1995 |
| JP | 07-332208 | 12/1995 |
| JP | 8-109861 | 4/1996 |
| JP | 08-121285 | 5/1996 |
| JP | 8-144889 | 6/1996 |
| JP | 09-203357 | 8/1997 |
| JP | 10-054318 | 2/1998 |
| JP | 10-115270 | 5/1998 |
| JP | 10-141194 | 5/1998 |
| JP | 10-227239 | 8/1998 |
| JP | 11-082250 | 3/1999 |
| JP | 11-132076 | 5/1999 |
| JP | 11-159424 | 6/1999 |
| JP | 11-315733 | 11/1999 |
| JP | 11-324765 | 11/1999 |
| JP | 11-350966 | 12/1999 |
| JP | 2000-097131 | 4/2000 |
| JP | 2000-97132 A | 4/2000 |
| JP | 2000-130234 | 5/2000 |
| JP | 2000-240494 | 9/2000 |
| JP | 2001-115919 | 4/2001 |
| JP | 2001-164961 | 6/2001 |
| JP | 2001-248478 | 9/2001 |
| JP | 2002-047973 | 2/2002 |
| JP | 2002-048035 | 2/2002 |
| JP | 2002-195141 | 7/2002 |
| JP | 2002-227697 | 8/2002 |
| JP | 2002-317738 | 10/2002 |
| JP | 2004-027911 | 1/2004 |
| JP | 2004-28024 | 1/2004 |
| JP | 4-94434 | 3/2004 |
| JP | 2004-270531 | 9/2004 |
| JP | 2004-308510 | 11/2004 |
| JP | 2006-57594 | 3/2006 |
| WO | WO 01/79690 A1 | 10/2001 |

OTHER PUBLICATIONS

Co-pending U.S. Appl. No. 11/378,922, filed Mar. 17, 2006, "Internal Combustion Engine Provided with Double System of Fuel Injection".

Co-pending U.S. Appl. No. 11/378,070, filed Mar. 17, 2006, "Internal Combustion Engine Provided with Double System of Fuel Injection".

Co-pending U.S. Appl. No. 11/378,123, filed Mar. 17, 2006, "Internal Combustion Engine".

PCT International Search Authority Written Opinion, PCT/JP2006/302628, Mar. 6, 2007.

* cited by examiner

DUAL-INJECTOR FUEL INJECTION ENGINE

BACKGROUND OF THE INVENTION

The present invention relates to a dual-injector fuel injection engine in which fuel is injected into a combustion chamber and intake passage from respective injectors.

Generally, in a conventional automobile engine, one fuel injector is provided to each cylinder. In an engine of this type, an injector which injects fuel directly into a combustion chamber and an injector which injects fuel into an intake passage may be provided in order to improve the output and fuel cost, as disclosed in, e.g., Japanese Patent Laid-open No. 11-315733 (to be merely referred to as reference 1 hereinafter) or 2002-48035 (to be merely referred to as reference 2 hereinafter).

In the engine described in reference 1, an in-cylinder injector which injects fuel into the combustion chamber is attached to that lower end of a cylinder head which is close to a cylinder block. An injector which injects fuel (light oil) into an intake passage is attached to that side of the cylinder head which is opposite to the in-cylinder injector across an intake port.

The engine described in reference 2 is a multi-cylinder engine. An in-cylinder injector is arranged at the lower end of a cylinder head. An intake pipe injector which injects fuel into an intake passage is arranged in an intake manifold attached to the cylinder head.

The intake manifold extends upward from a side portion of the cylinder head and then to the other side of the cylinder head across a portion above the cylinder head. In the intake manifold, a surge tank is arranged above the cylinder head, and a throttle valve is arranged in the vicinity of the upstream of the surge tank. A supercharger is connected to the upstream of the throttle valve through an intake pipe.

The two types of injectors shown in reference 2 are attached such that delivery pipes are fitted in their ends opposite to the fuel injection ports, and the fuel is supplied from the delivery pipes. Of the two types of injectors, the intake pipe injector is attached to the outer side of that curved portion of the intake manifold which is curved beside the cylinder head and extends vertically.

An engine as described in reference 1 or 2 in which each cylinder is provided with two injectors has a larger number of injectors than in a general engine. Accordingly, the number of assembling steps increases to make the assembly cumbersome. More specifically, when actually manufacturing an engine of this type, operation of attaching the intake pipe injector and its delivery pipe to the engine and operation of attaching the intake manifold to the cylinder head are performed almost simultaneously in a narrow area. Hence, until one of the two operations ends, the other operation must wait. The intake manifold must be attached and detached in maintenance of the intake pipe injector. The problem of overlapping operations thus occurs not only in the manufacture of the engine but also in the maintenance as well.

As shown in reference 2, often, the intake pipe injector and its delivery pipe are connected to each other by fitting the intake pipe injector in the delivery pipe, and they are sealed by a seal member such as an O-ring. If the intake pipe injector and its delivery pipe are aligned incompletely, fuel may leak from the sealed portion partly because the fuel is pressurized excessively.

Therefore, an engine in which each cylinder is provided with two injectors should be assembled easily and appropriately without requiring overlapping operations, as described above.

When an intake pipe injector is to be mounted in an engine of this type readily, the intake pipe injector should not extend outside the intake manifold to make the engine bulky, as in the engine shown in reference 2.

SUMMARY OF THE INVENTION

The present invention has been made to solve the above problems, and has as its object to provide a dual-injector fuel injection engine in which, while two types of injectors can be mounted in the engine in a compact manner, the intake pipe injector and a delivery pipe can be mounted and maintained easily with high mounting accuracy.

In order to achieve the above object, according to the present invention, there is provided a dual-injector fuel injection engine comprising a cylinder block formed with a plurality of cylinder holes, a cylinder head attached on the cylinder block, an intake port formed in the cylinder head to extend from a combustion chamber obliquely upward with respect to an axis of each cylinder and serving as an intake passage for each cylinder, an intake manifold connected to the intake port at a downstream end thereof and including an intake passage branch for each cylinder, a surge tank provided upstream of the intake manifold and shared by a plurality of cylinders, an in-cylinder injector provided to each cylinder to inject feel directly into the combustion chamber, an intake pipe injector provided to each cylinder to inject the fuel into the intake port, a first delivery pipe connected to all in-cylinder injectors to supply the fuel thereto, and a second delivery pipe connected to all intake pipe injectors to supply the fuel thereto, wherein the in-cylinder injector is positioned below the intake port, when seen from an axial direction of a crank shaft, and attached to the cylinder head, and the intake pipe injector and the second delivery pipe are supported above the intake port, when seen from the axial direction of the crank shaft, by the intake manifold to be close to the intake port.

DESCRIPTION OF THE PREFERRED EMBODIMENTS

First Embodiment

A dual-injector fuel injection engine according to one embodiment of the present invention will be described with reference to FIGS. 1 to 8.

Figure 1:
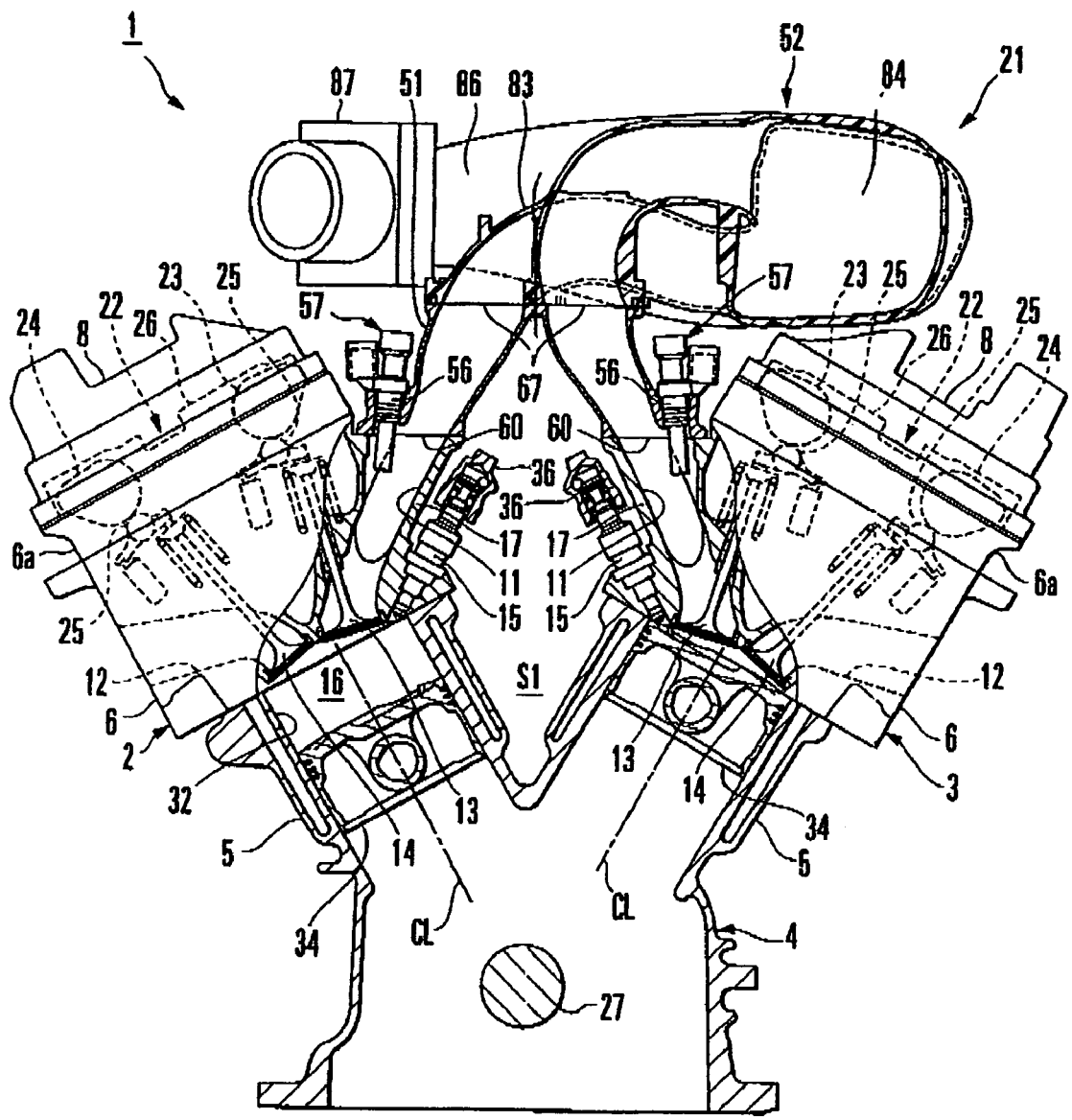
FIG. 1 is a front view of the dual-injector fuel injection engine according to the present invention.
Figure 2:
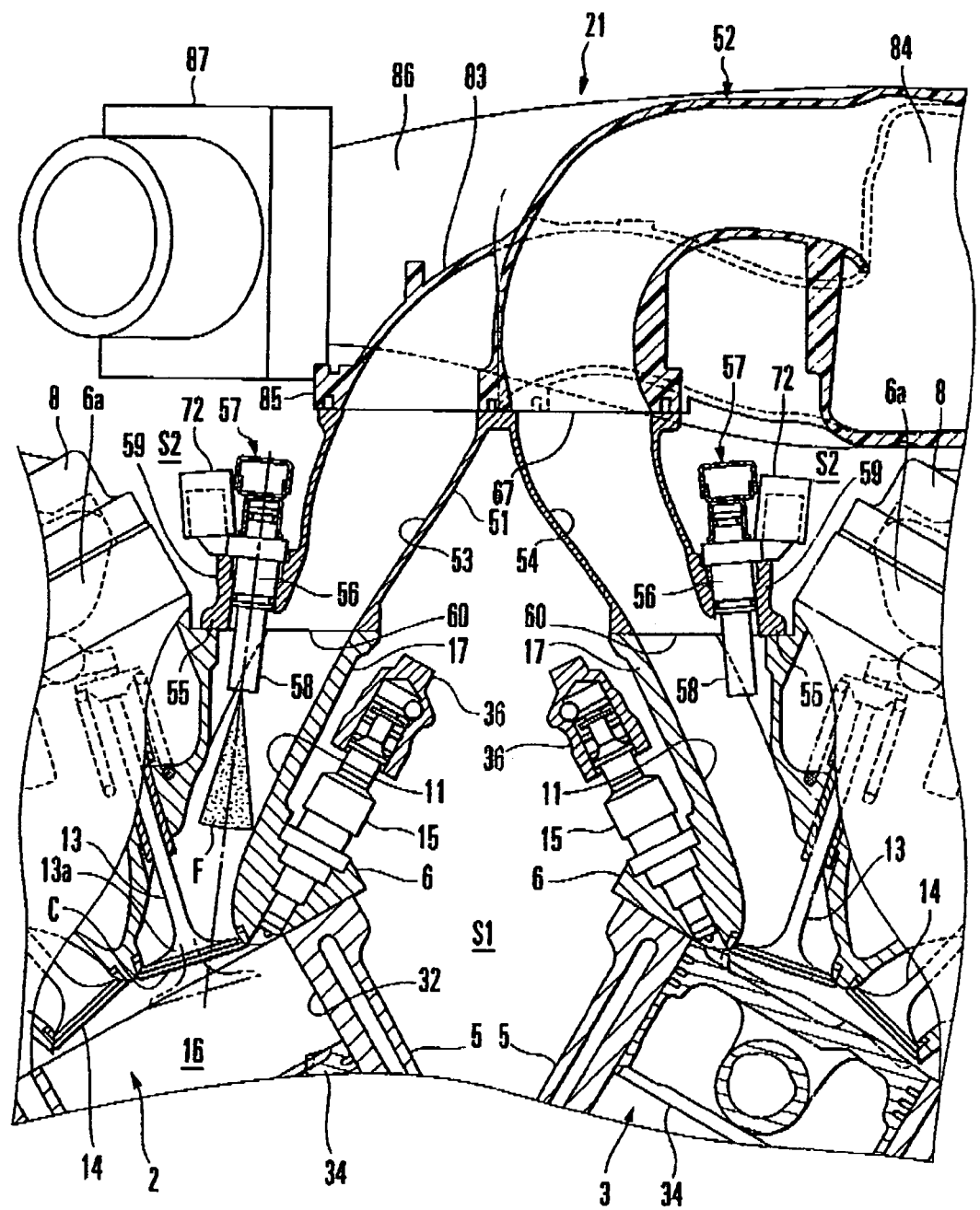
FIG. 2 is an enlarged sectional view of the main part.
Figure 3:
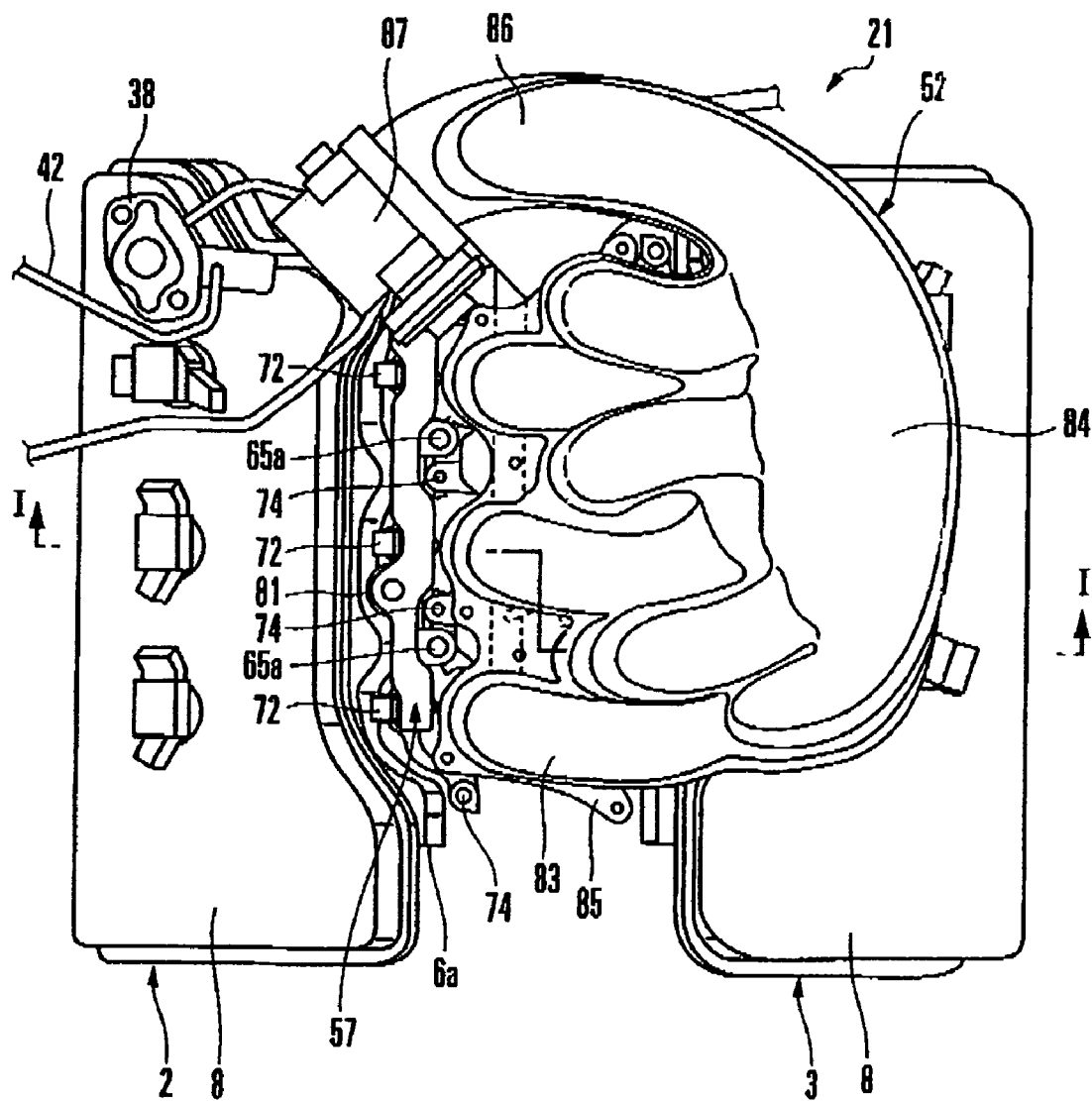
FIG. 3 is a plan view of the dual-injector fuel injection engine according to the present invention.
Figure 4:
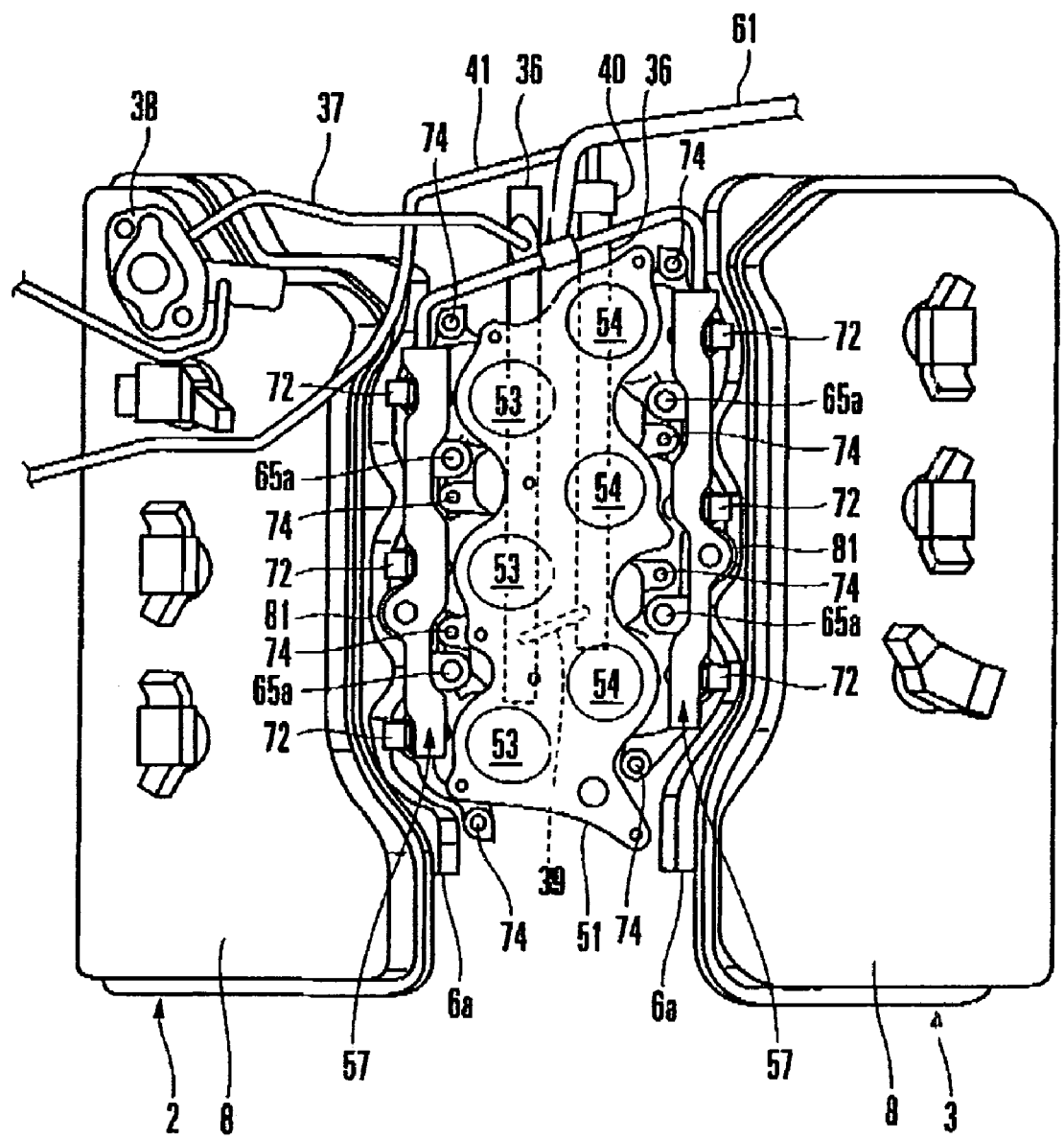
FIG. 4 is a plan view of the dual-injector fuel injection engine according to the present invention.

FIGS. 1 and 2 show the main part of a dual-injector fuel injection engine according to the present invention. FIG. 3 shows a state wherein an intake manifold is mounted, and FIG. 4 shows a state wherein the intake manifold is removed. FIGS. 5 to 8 show a sub-intake manifold.

A dual-injector fuel injection engine 1 according to this embodiment is a V-type 6-cylinder engine to be mounted in an automobile, and comprises a first cylinder row 2 located on the left side in FIG. 1 and a second cylinder row 3 located on the right side in FIG. 1. The cylinder rows 2 and 3 have the same arrangement, and accordingly the first cylinder row 2 will be described in detail. The respective members of the second cylinder row 3 are denoted by the same reference numerals as in the first cylinder row 2, and a description thereof will be omitted.

Each of the cylinder rows 2 and 3 comprises a cylinder portion 5, cylinder head 6, cam housing 6a, head cover 8, and the like. The cylinder portion 5 projects from a cylinder block 4 shared by the two cylinder rows 2 and 3 and has a plurality of cylinder holes 32. The cylinder head 6 is attached on the cylinder portion 5. The cam housing 6a is attached on the cylinder head 6. The cam housing 6a forms part of the cylinder head 6.

The cylinder head 5 has an intake port 11 serving as an intake passage on its one side portion (this side will be referred to as inside a V-bank hereinafter) close to the other cylinder row, and an exhaust port 12 serving as an exhaust passage on its other side portion, and is provided with intake valves 13, exhaust valves 14, and in-cylinder injectors 15. This will be described in detail. As shown in FIG. 1, the intake port 11 is located inside the two cylinder rows 2 and 3 which line up to form a V shape when seen from the axial direction of a crank shaft 27. The intake port 11 branches to form a Y shape in the cylinder head 6. In the intake port 11, each cylinder is provided with the two intake valves 13.

The intake port 11 according to this embodiment extends straight from its downstream end, formed in that portion of the cylinder head 6 which forms the upper wall of a combustion chamber 16, obliquely upward with respect to an axis CL (see FIG. 1) of the corresponding cylinder. The upstream end of the intake port 11 forms an intake pipe connecting portion 17 which is formed at the end of the inner side of the V-bank of the cylinder head 6 project toward the other cylinder row. The upper end of the intake pipe connecting portion 17 forms a substantially horizontal flat surface, as shown in FIG. 2, where an intake manifold 21 (to be described later) is attached.

The exhaust port 12 forms a Y shape, in the same manner as the intake port 11. In the exhaust port 12, each cylinder is provided with the two exhaust valves 14.

The intake valves 13 and exhaust valves 14 are driven by a valve actuator 22 arranged at the upper portion of the cylinder head 6. In the valve actuator 22, an intake cam shaft 23 and exhaust cam shaft 24 push down the intake valves 13 and exhaust valves 14 through their respective rocker arms 25. The intake cam shaft 23 and exhaust cam shaft 24 are rotatably supported by the cam housing 6a and a cam cap 26 attached on the cam housing 6a, and rotate when power is transmitted to them from the crank shaft 27.

As shown in FIGS. 1 and 2, the in-cylinder injector 15 is attached to that lower end of the inner side of the V-bank which is at the lower end of the cylinder head 6. In this embodiment, the in-cylinder injector 15 is located under the intake port 11 (shown in FIGS. 1 and 2) when seen from the axial direction of the crank shaft 27, and attached to the cylinder head 6 to extend substantially parallel to the intake port 11. In other words, the in-cylinder injector 15 is arranged in an inner space S1 sandwiched by the intake passage of the first cylinder row 2 and the intake passage of the second cylinder row 3. In FIGS. 1 and 2, reference numeral 32 denotes the cylinder hole; and 34, pistons.

The in-cylinder injector 15 supplies fuel mainly when the engine 1 is in the high-speed, high-load operation range. The injection timing of the in-cylinder injector 15 is so set as to inject the fuel during an intake stroke.

A high-pressure delivery pipe 36 which constitutes the first delivery pipe in the present invention is attached to the upper end of the in-cylinder injector 15. The high-pressure delivery pipe 36 is arranged for each cylinder row, as shown in FIG. 4, and extends parallel to the axis of the crank shaft 27. Each high-pressure delivery pipe 36 is fixed as it is irremovably fitted on the upper end of the in-cylinder injector 15, and supported by the cylinder head 6.

One end (upper side in FIG. 4) of the high-pressure delivery pipe 36 on the side of the first cylinder row 2 is connected to a high-pressure fuel pump 38 through a fuel supply pipe 37, as shown in FIG. 4. The other end of the high-pressure delivery pipe 36 on the side of the first cylinder row 2 is connected to the other end of the high-pressure delivery pipe 36 on the side of the second cylinder row 3 through a communication pipe 39. One end of a fuel return pipe 41 is connected to one end located on the upper side in FIG. 4 of the high-pressure delivery pipe 36 on the side of the second cylinder row 3 through a relief valve 40. The other end of the fuel return pipe 41 is connected to a fuel tank (not shown).

The high-pressure fuel pump 38 takes in the fuel from a fuel inlet pipe 42, pressurizes it to such a pressure that it can be supplied to the in-cylinder injector 15, and supplies it to the high-pressure delivery pipes 36. The fuel discharged from a feed pump (not shown) in the fuel tank flows into the fuel inlet pipe 42. The high-pressure fuel pump 38 according to this embodiment is attached on the head cover 8 of the first cylinder row 2, as shown in FIG. 4, and driven by the exhaust cam shaft 24 of the first cylinder row 2.

The intake manifold 21 attached to the intake pipe connecting portion 17 of the cylinder head 6 comprises a sub-intake manifold 51 placed on and fixed to the intake pipe connecting portion 17, and a main intake manifold 52 detachably attached to the upper end of the sub-intake manifold 51, as shown in FIGS. 1 and 3. The intake passage branches for the respective cylinders of the intake manifold 21 are located inside the two cylinder rows 2 and 3 which line up to form the V shape when seen from the axial direction of the crank shaft 27, as shown in FIG. 1.

Figure 5:
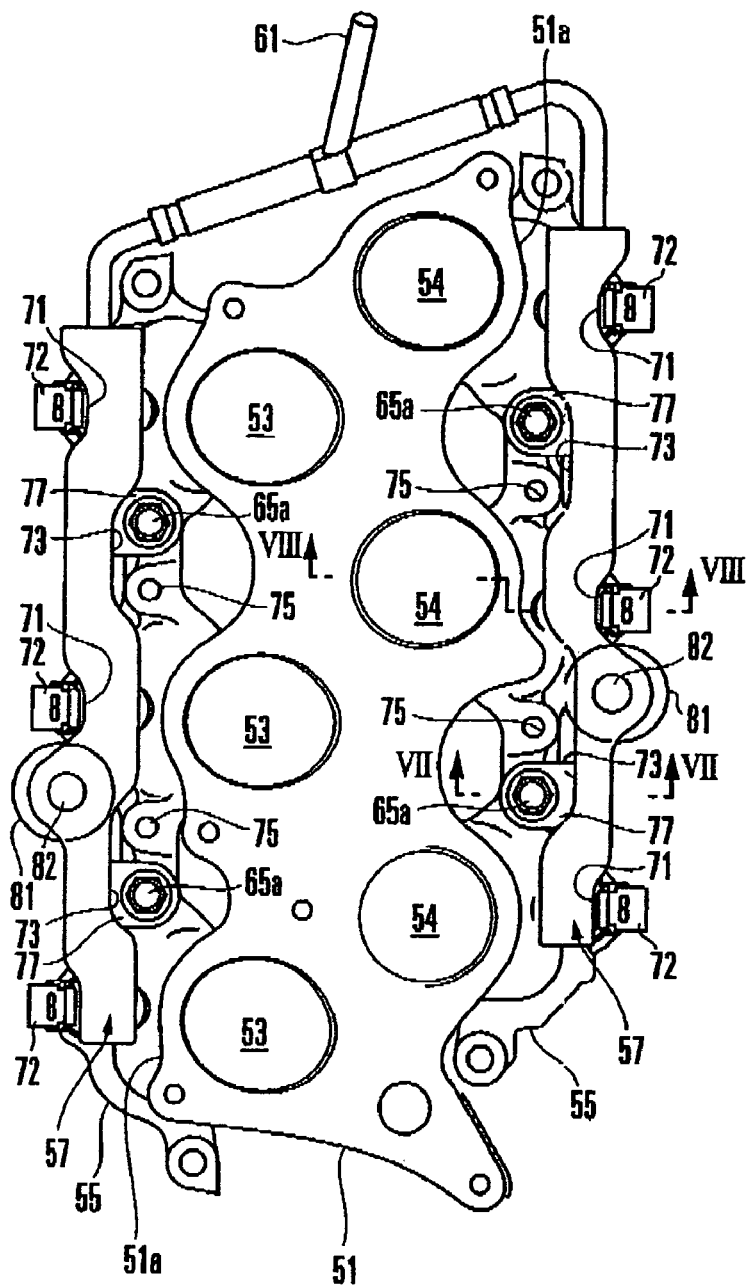
FIG. 5 is a plan view of the sub-intake manifold.
Figure 6:
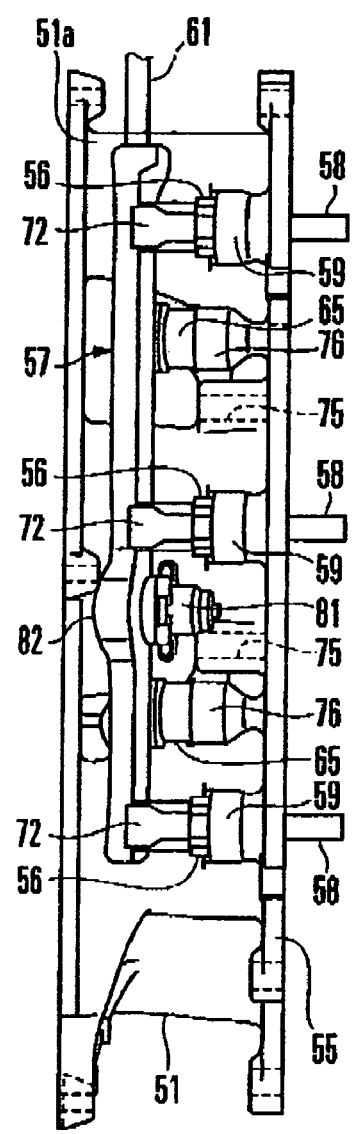
FIG. 6 is a side view of the sub-intake manifold.

The sub-intake manifold 51 is molded from an aluminum alloy into a predetermined shape by casting. As shown in FIGS. 2, 5, and 6, the sub-intake manifold 51 has a plurality of intake passages 53, on its one side, to be connected to the intake port 11 of the first cylinder row 2, and a plurality of intake passages 54, on its other side, to be connected to the intake port 11 of the second cylinder row 3.

The intake passages 53 or 54 are provided for the respective intake ports 11 and formed to extend obliquely upward without substantially changing the angles of inclination of the corresponding intake ports 11. The inner diameters of the intake passages 53 and 54 gradually increase upward (toward the upstream side of the intake air). One and the other sides of the sub-intake manifold 51 having the intake passages 53 and 54 constitute the downstream portion of the intake manifold according to claim 2 of the present invention. The main intake manifold 52 constitutes the upstream portion of the intake manifold according to claim 2 of the present invention.

The lower end of the sub-intake manifold 51 integrally has a connection flange 55, as shown in FIGS. 2, 5, and 6.

The flange 55 has a function of fixing the sub-intake manifold 51 to the intake pipe connecting portion 17 of the cylinder head 6 and a function of supporting an intake pipe injector 56 and low-pressure delivery pipe 57 (to be described later).

Figure 8:
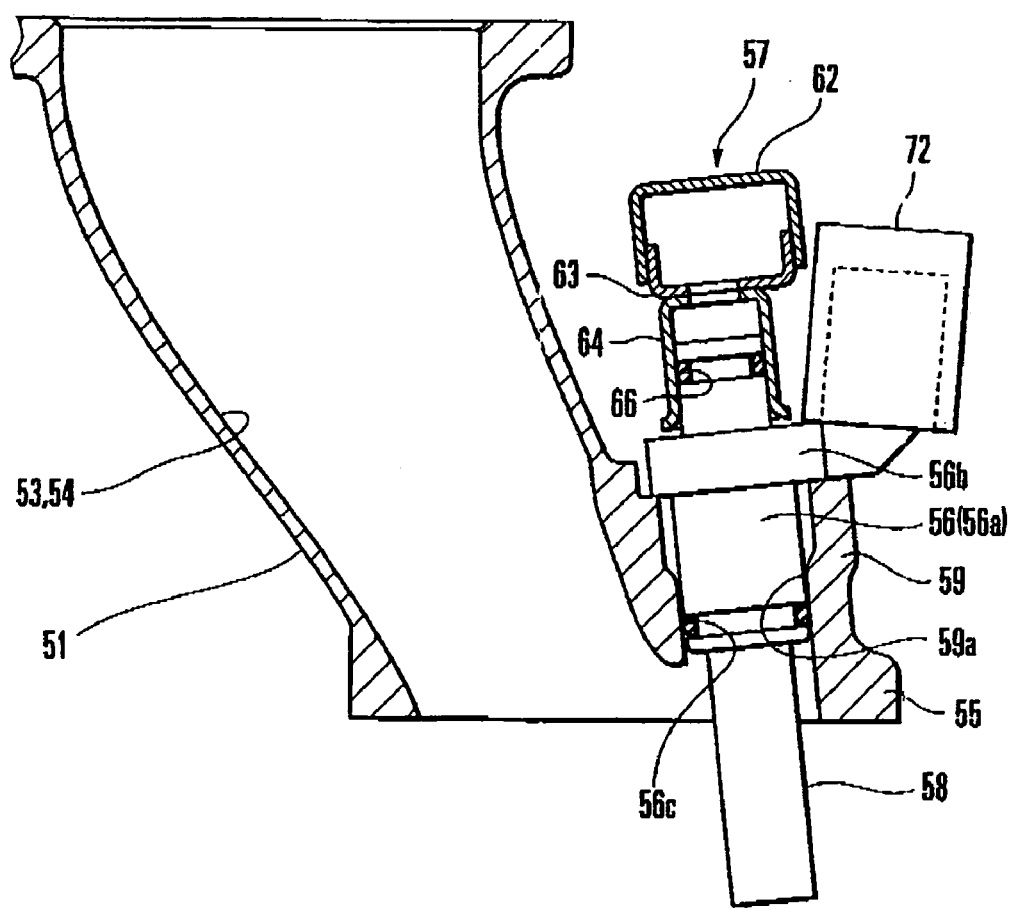
FIG. 8 is a sectional view taken along the line VIII-VIII of FIG. 5.

As shown in FIG. 2, the intake pipe injector 56 is provided with a fuel injecting portion 56 at its lower end and connected to the low-pressure delivery pipe 57 (to be described later) at its upper end. The intake pipe injector 56 has, at its central portion in the axial direction, a shaft-shaped portion 56a to fit in an attaching hole 59a formed in an attaching seat 59 of the flange 55, and a flange portion 56b to project outwardly in the radial direction above the shaft-shaped portion 56a, as shown in FIG. 8. An O-ring 56c is mounted to the lower portion of the shaft-shaped portion 56a to seal the gap between the shaft-shaped portion 56a and attaching hole 59a. Although not shown, the intake pipe injector 56 and low-pressure delivery pipe 57 are provided with an alignment means which aligns the intake pipe injector 56 in the rotational direction (to be described later) when attaching the intake pipe injector 56 to the flange 55. The rotational direction refers to the direction in which the intake pipe injector 56 rotates about the center line extending in the longitudinal direction of the intake pipe injector 56 as the center. The alignment means aligns the intake pipe injector 56 in the rotational direction with respect to the low-pressure delivery pipe 57.

The intake pipe injector 56, without being mounted with the low-pressure delivery pipe 57, is attached to the flange 55. When attaching the intake pipe injector 56 to the flange 55, first, the fuel injecting portion 58 of the intake pipe injector 56 is inserted in the attaching hole 59a from above, and the shaft-shaped portion 56a is fitted in the attaching hole 59a. The flange portion 56b of the intake pipe injector 56 is abutted against the upper surface of the attaching seat 59. In this state, the low-pressure delivery pipe 57 is mounted at the upper end of the intake pipe injector 56. At this time, the intake pipe injector 56 is aligned in the rotational direction by the alignment member (described above). After the low-pressure delivery pipe 57 is mounted on the intake pipe injector 56 in this manner, the low-pressure delivery pipe 57 is attached to the sub-intake manifold 51. When the low-pressure delivery pipe 57 is attached to the sub-intake manifold 51 as described above, the intake pipe injector 56 is fixed to be urged against the attaching seat 59 of the flange 55 from above.

The intake pipe injector 56 according to this embodiment supplies the fuel mainly when the engine is in the low- or middle-speed operation range.

As shown in FIG. 2, the attaching seat 59 is located at a position close to a mating surface 60 of the sub-intake manifold 51 and cylinder head 6, on the side closer to the cam housing 6a of the cylinder head 6 than the intake passages 53 and 54. When the intake pipe injector 56 is attached to the attaching seat 59, the intake pipe injector 56 is supported above the intake port 11, when seen from the axial direction of the crank shaft 27, by the sub-intake manifold 51 to be close to the intake port 11, as shown in FIG. 1. In other words, the intake pipe injector 56 is located at a position close to the intake port 11 of the cylinder head 6, in a space S2 defined by the sub-intake manifold 51 (the intake passage branches of the intake manifold 21), the cam housing 6a, and the head covers 8 (on the cylinder head 6). The intake pipe injector 56 is also located above the in-cylinder injector 15, at a position where it overlaps the in-cylinder injector 15 when seen from top, although not shown.

The fuel injecting portion 58 of the intake pipe injector 56 has such a length that it projects downward from the mating surface 60 of the sub-intake manifold 51 and cylinder head 6, and opposes the interior of the upstream end of the intake port 11 from above. The length of the fuel injecting portion 58 is set such that the distance between a fuel injection port (not shown) formed at the distal end of the fuel injecting portion 58 and a valve face center C of a valve body 13a (canopy) of the intake valves 13 is 80 mm to 120 mm.

The fuel injection port of the fuel injecting portion 58 injects fuel F (see FIG. 2) substantially in the form of a cone. The fuel injecting direction of the intake pipe injector 56 is set such that the center line of the cone is directed toward the valve face center C or its vicinity of the intake valve 13 in an open state, as shown in FIG. 2.

The low-pressure delivery pipe 57 attached to the upper ends of the intake pipe injectors 56 is provided to each cylinder row, as shown in FIGS. 4 and 5, and extends in the axial direction (a direction perpendicular to the axial directions of the intake pipe injectors 56) of the crank shaft 27. The fuel is supplied to each low-pressure delivery pipe 57 from the feed pump (not shown) located in the fuel tank through a fuel supply pipe 61 connected to one end on the upper side in FIG. 5 of the low-pressure delivery pipe 57.

As shown in FIGS. 2 and 8, each low-pressure delivery pipe 57 comprises an upper member 62 having a downward U-shaped section, a lower member 63 which closes the opening at the lower end of the upper member 62, and members 64 which project downward from positions corresponding to the respective intake pipe injectors 56. Each low-pressure delivery pipe 57 is supported by the flange 55 of the sub-intake manifold 51 with two insulators 65 (see FIG. 7) (to be described later). The low-pressure delivery pipes 57 constitute the second delivery pipe of the present invention.

As shown in FIG. 6, the upper member 62 and lower member 63 do not largely project or recessed in the vertical direction but extend substantially flat in a horizontal direction (the vertical direction in FIG. 6) which is perpendicular to the axial directions of the intake pipe injectors 56. As shown in FIG. 5, the upper member 62 and lower member 63 flex such that portions close to a side wall surface 51a of the sub-intake manifold 51 and portions away from the side wall surface 51a alternate when seen from the axial directions (the direction shown in FIG. 5) of the intake pipe injectors 56.

Each connection member 64 is welded to the lower surface of that portion, which is close to the side wall surface 51a of the sub-intake manifold 51, of the low-pressure delivery pipe 57 which flexes substantially in a waving manner when seen from the top, as described above. The interior of the connection member 64 communicates with a main fuel passage formed in the upper member 62 and lower member 63, so the fuel is guided to the interior of the connection member 64. The low-pressure delivery pipe 57 is connected to the intake pipe injector 56 through the connection member 64.

As shown in FIG. 8, the connection member 64 forms a cylinder which opens downward. The upper end of the intake pipe injector 56 is fitted in the connection member 64. An O-ring 66 to seal the gap between the connection member 64 and intake pipe injector 56 is mounted at the upper end of the intake pipe injector 56. The low-pressure delivery pipe 57 according to this embodiment, when it is connected to the intake pipe injector 56 through the connection member 64 (when it is attached to the engine 1), is located at a position lower than a mating surface 67 of the sub-intake manifold 51 and main intake manifold 52, as shown in FIGS. 1, 2, and 6.

At those portions of the low-pressure delivery pipe 57 which are close to the side wall surface 51a of the sub-intake manifold 51, recesses 71 are formed on a side opposite to the side wall surface 51a in the plan view shown in FIG. 5. Connectors 72 of the intake pipe injectors 56 are disposed in the recesses 71 to be located at substantially the same heights (see FIG. 6).

Figure 7:
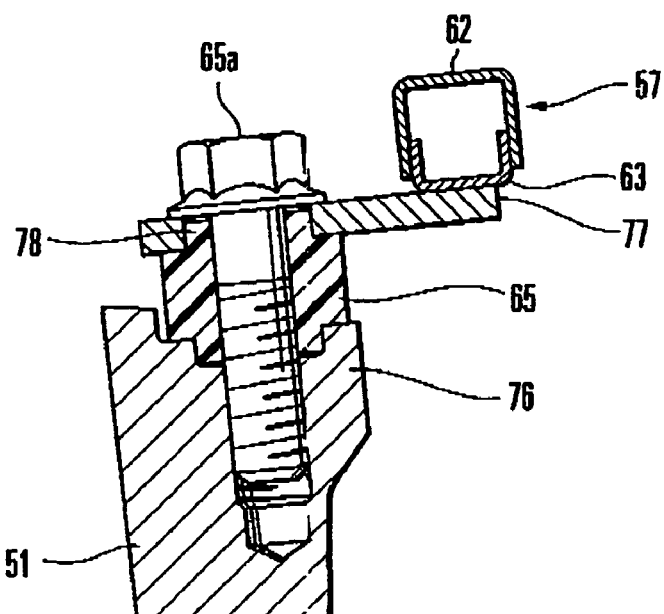
FIG. 7 is a sectional view taken along the line VII-VII of FIG. 5.

At those portions of the low-pressure delivery pipe 57 which are away from the side wall surface 51a, recesses 73 are formed to oppose the side wall surface 51a in the plan view shown in FIG. 5. An attaching bolt 65a (to be described later) and a bolt hole 75 to insert an attaching bolt 74 (see FIG. 4) therein are located between each recess 73 and the side wall surface 51a. As shown in FIG. 7, the attaching bolt 65a serves to attach the low-pressure delivery pipe 57 to the sub-intake manifold 51 through the insulator 65. The attaching bolt 74 serves to attach the sub-intake manifold 51 to the cylinder head 6.

The insulator 65 constitutes a heat-insulating member according to claim 5 of the present invention, has a cylindrical shape, as shown in FIG. 7, and is attached to an attaching seat 76 formed on the flange 55 of the sub-intake manifold 51 with the attaching bolt 65a. The insulator 65 holds a plate-type bracket 77, having one end welded to the low-pressure delivery pipe 57, by fitting at an upper end 78 of the insulator 65.

In this embodiment, the insulator 65 is made of a phenol resin-type synthetic resin material. The plate-type bracket 77 is irremovably held by the head of the attaching bolt 65a.

In this embodiment, the low-pressure delivery pipe 57 is away from the side wall surface 51a at two portions, to one of which a pulsation damper 81 which attenuates pulsation of the fuel in the low-pressure delivery pipe 57 is attached from below (see FIGS. 5 and 6). The pulsation damper 81 is attached to the lower member 63 from below. That portion of the upper member 62 which opposes the pulsation damper 81 has a swelling portion 82 which projects upward to be higher than the remaining portions. The swelling portion 82 prevents the upper end of the pulsation damper 81 from coming into contact with the upper member 62. The pulsation damper 81 is thus mounted on an uppermost side.

As shown in FIGS. 1 and 3, the main intake manifold 52 comprises a pipe-shaped portion 83 which forms the intake passage branches for respective cylinders together with the intake passages 53 and 54 of the sub-intake manifold 51, and a surge tank 84 arranged at the upstream end of the pipe-shaped portion 83. The main intake manifold 52 according to this embodiment is assembled into a predetermined shape by welding three plastic divisional bodies by vibrational welding. As shown in FIG. 1, the pipe-shaped portion 83 of the intake manifold 21 is located inside the two cylinder rows 2 and 3 which line up to form the V shape when seen from the axial direction of the crank shaft 27.

A flange 85 (see FIGS. 2 and 3) having the same shape as that of the upper surface of the sub-intake manifold 51 is formed at the downstream end of the pipe-shaped portion 83. The pipe-shaped portion 83 is attached to the sub-intake manifold 51 through the flange 85.

As shown in FIG. 1, the pipe-shaped portion 83 extends from the sub-intake manifold 51 to above the second cylinder row 3. Thus, the upper portion of the space S2 where the intake pipe injectors 56 on the side of the second cylinder row 3 are located is covered with the pipe-shaped portion 83.

As shown in FIGS. 1 and 3, the surge tank 84 is disposed above the head cover 8 of the second cylinder row 3. An air inlet pipe 86 which extends toward the other cylinder row is provided to one end located on the upper side in FIG. 3 of the surge tank 84. The distal end of the air inlet pipe 86 is located above the first cylinder row 2, and provided with a throttle valve 87.

Intake air passing through the throttle valve 87 passes through the intake passage comprising the interior of the air inlet pipe 86, the interior of the surge tank 84, the interior of the pipe-shaped portion 83, the intake passages 53 and 54, and the intake port 11 and flows into the combustion chamber 16. The intake port 11 is not provided with a swirl control valve to generate a swirl in the combustion chamber, a tumble control valve to generate a tumble in the combustion chamber, or a member corresponding to any such valve. Namely, the intake port 11 constitutes a so-called high-flow-rate intake port. The swirl described above refers to the circulating flow of intake air about the axis of the cylinder as the center. The tumble described above refers to the circulating flow of intake air which circulates about the center line in a direction intersecting the axis of the cylinder.

In the dual-injector fuel injection engine 1 having the arrangement as described above, the intake pipe injectors 56 of the respective cylinders and the low-pressure delivery pipes 57 to be connected to the intake pipe injectors 56 are supported by one sub-intake manifold 51. Thus, the intake pipe injectors 56 and low-pressure delivery pipes 57 can be mounted in the sub-intake manifold 51 so as to form one assembly.

Therefore, the operation of mounting the intake pipe injectors 56 and low-pressure delivery pipes 57 can be performed prior to mounting the intake manifold 21 to the engine 1. The intake pipe injectors 56 and low-pressure delivery pipes 57 can be removed from the engine 1 by removing the intake manifold 21 from the engine 1. Thus, the intake pipe injectors 56 can be maintained easily.

The in-cylinder injectors 15 and intake pipe injectors 56 according to this embodiment are located to be divided into the downstream side and upstream side of the intake air and arranged to be distributed into the lower side and upper side across the intake passage. Therefore, in this engine 1, the two types of injectors 15 and 56, or the delivery pipes 36 and 57 do not interfere with each other.

In the dual-injector fuel injection engine 1 according to this embodiment, the intake pipe injectors 56 and low-pressure delivery pipes 57 are supported by the intake manifold 21. Accordingly, inspection on fuel leakage from the intake pipe injectors 56 and low-pressure delivery pipes 57 can be performed prior to mounting the intake manifold 21 on the dual-injector fuel injection engine 1. Therefore, any other member does not interfere with the above inspection.

In the dual-injector fuel injection engine 1 according to this embodiment, the intake pipe injectors 56 and low-pressure delivery pipes 57 are supported by the intake manifold 21, as described above. Accordingly, the low-pressure delivery pipes 57 can be aligned with the intake pipe injectors 56 highly accurately. Therefore, the fitting portions of the intake pipe injectors 56 and the connection members 64 of the low-pressure delivery pipes 57 can be aligned highly accurately.

In the dual-injector fuel injection engine 1 according to this embodiment, the intake manifold 21 is divided into the sub-intake manifold 51 and main intake manifold 52, and the intake pipe injectors 56 and low-pressure delivery pipes 57 are attached to the relatively small sub-intake manifold 51.

Therefore, handlings such as conveyance of the assembly constituted by the sub-intake manifold 51, intake pipe injectors 56, and low-pressure delivery pipes 57, and attaching and detaching of the assembly on and from the engine 1 can be performed easily.

In the dual-injector fuel injection engine 1 according to this embodiment, the attaching seats 59 of the intake pipe injectors 56 are arranged at positions close to the mating surface 60 of the cylinder head 6 and sub-intake manifold 51. Accordingly, the intake pipe injectors 56 can be attached to the sub-intake manifold 51 to be as low as possible. In spite that the pipe-shaped portion 83 of the main intake manifold 52 is arranged above the intake pipe injectors 56, the pipe-shaped portion 83 can be arranged at a low position. As a result, when mounting the engine 1 in the front engine room of an automobile, a sufficiently large gap can be reserved between an engine hood (not shown) and the engine 1.

In this engine, the intake pipe injectors 56 are disposed in the space S2, surrounded by the pipe-shaped portion 83 of the main intake manifold 52, the sub-intake manifold 51, and the members of the cylinder head 6, to be away from these members. When setting the attaching angles of the intake pipe injectors 56, since the intake pipe injectors 56 will not interfere with the respective surrounding members, the degrees of freedom in design of the attaching angles increase. As a result, the fuel injecting directions of the intake pipe injectors 56 can be set toward the valve bodies 13a of the intake valves 13, as shown in this embodiment.

In the dual-injector fuel injection engine 1 according to this embodiments the low-pressure delivery pipes 57, in an attaching state of being fitted on the upper ends of the intake pipe injectors 56, are located to be lower than the mating surface 67 of the sub-intake manifold 51 and main intake manifold 52. Therefore, with this engine 1, the pipe-shaped portion 83 can be arranged at a low position while avoiding interference between the pipe-shaped portion 83 of the main intake manifold 52 and the low-pressure delivery pipes 57.

The low-pressure delivery pipes 57 according to this embodiment are supported by the attaching seats 76 arranged on the flange 55 at the lower end of the sub-intake manifold 51 through the insulators 65. Therefore, the sufficiently long insulators 65 can be mounted by using the space between the flange 55 and the low-pressure delivery pipes 57 which are upwardly away from the connection flange 55 by an amount corresponding to the length of each intake pipe injector 56.

In the dual-injector fuel injection engine 1 according to this embodiment, the fuel injecting portions 58 of the intake pipe injectors 56 project closer toward the cylinder head 6 than the mating surface 60 of the sub-intake manifold 51 and cylinder head 6. Therefore, the intake pipe injectors 56 can be positioned at low positions, and the distance between the intake pipe injectors 56 and the valve bodies 13a of the intake valves 13 can be made short. In the engine 1, since the fuel injecting portions 58 project downward to be lower than the mating surface 60, when compared to a case wherein the fuel injecting portions 58 are located above the mating surface 60, the attaching seats 59 of the sub-intake manifold 51 can be formed thinner.

Of the sub-intake manifold 51 of the dual-injector fuel injection engine 1 according to this embodiment, its one side having the intake passages 53 on the side of the first cylinder row 2 and its other side having the intake passages 54 on the side of the second cylinder row 3 are formed integrally. Hence, the sub-intake manifold 51 can support all the intake pipe injectors 56 and low-pressure delivery pipes 57 of the V-type multi-cylinder engine 1. Therefore, with the engine 1 according to this embodiment, the plurality of intake pipe injectors 56 and low-pressure delivery pipes 57 can be mounted easily. In addition, the plurality of intake pipe injectors 56 car be removed at once to facilitate maintenance.

In the dual-injector fuel injection engine 1 according to this embodiment, the intake port 11 and the intake passage branch of each cylinder of the intake manifold 21 are located inside the two cylinder rows which line up to form the V shape when seen from the axial direction of the crank shaft 27. The in-cylinder injectors 15 are arranged in the inner space sandwiched by the intake ports 11 of the respective cylinder rows. Therefore, the in-cylinder injectors 15 can be mounted by using the space formed between the two cylinder rows while avoiding interference with other members.

In addition, in this engine 1, the intake pipe injectors 56 are arranged in the space S2 sandwiched by the intake passage branches of the respective cylinders of the intake manifold 21 and the upper portions of the cylinder heads 6. Also, the upstream portion (main intake manifold 52) of the intake manifold 21 of the engine 1 is arranged to extend across above the intake pipe injectors 56 of the second cylinder row 3. Therefore, with this engine 1, the intake pipe injectors 56 can be mounted by effectively using the dead space S2 which is surrounded and formed by the upper portions of the cylinder heads 6, the intake passage branches of the respective cylinders of the intake manifold 21 extending upward from the cylinder heads 6, and the upstream portion of the intake manifold 21.

Therefore, with the engine 1 according to this embodiment, the two types of injectors 15 and 56, the high-pressure delivery pipes 36, and low-pressure delivery pipes 57 can be arranged in a compact manner between the first and second cylinder rows 2 and 3. As the main intake manifold 52 can be set close to the intake pipe injectors 56, the entire engine 1 car be formed to have a relatively small height. The effect of forming the engine 1 compact while suppressing its height is obtained as a result of effectively using the space formed in the V-type engine. This effect can similarly be obtained if the intake pipe injectors 56 are directly attached to the cylinder heads 6 in the space S2 or if the surge tank 84 of the intake cam shaft 23 covers the intake pipe injectors 56 from above.

In the dual-injector fuel injection engine 1 according to this embodiment, the intake pipe injectors 56 are connected to those portions of the low-pressure delivery pipes 57 which are close to the sub-intake manifold 51. According to this dual-injector fuel injection engine 1, the intake pipe injectors 56 can be arranged close to the intake manifold 21 so as to extend along the intake passage. Therefore, the fuel injecting directions of the intake pipe injectors 56 can be set toward the valve bodies of the intake valves 13. Also, the area of that portion of the intake passage where the injected fuel attaches can be decreased.

In the dual-injector fuel injection engine 1 according to this embodiment, as the connectors 72 of the intake pipe injectors 56 oppose the recesses 71 of the low-pressure delivery pipes 57, the connectors 72 can be arranged beside the low-pressure delivery pipes 57 so as not to largely project upward.

In the engine 1, the attaching bolts 65a for the low-pressure delivery pipes 57 and the attaching bolts 74 for the sub-intake manifold 51 are disposed between the recesses 73 of the low-pressure delivery pipes 57 and the side wall surface 51a of the sub-intake manifold 51. Therefore, in the engine 1, the bolts 65a and 74 can be arranged in a dead space formed between the low-pressure delivery pipes 57 and sub-intake manifold 51.

In the dual-injector fuel injection engine 1 according to this embodiment, the pulsation dampers 81 are attached to the lower portions of the low-pressure delivery pipes 57 from below, and the swelling portions 82 are formed at those upper portions of the low-pressure delivery pipes 57 which oppose the pulsation dampers 81. Hence, with the dual-injector fuel injection engine 1 according to this embodiment, the pulsation dampers 81 can be mounted under the low-pressure delivery pipes 57 in a compact manner.

Second Embodiment

Figure 9:
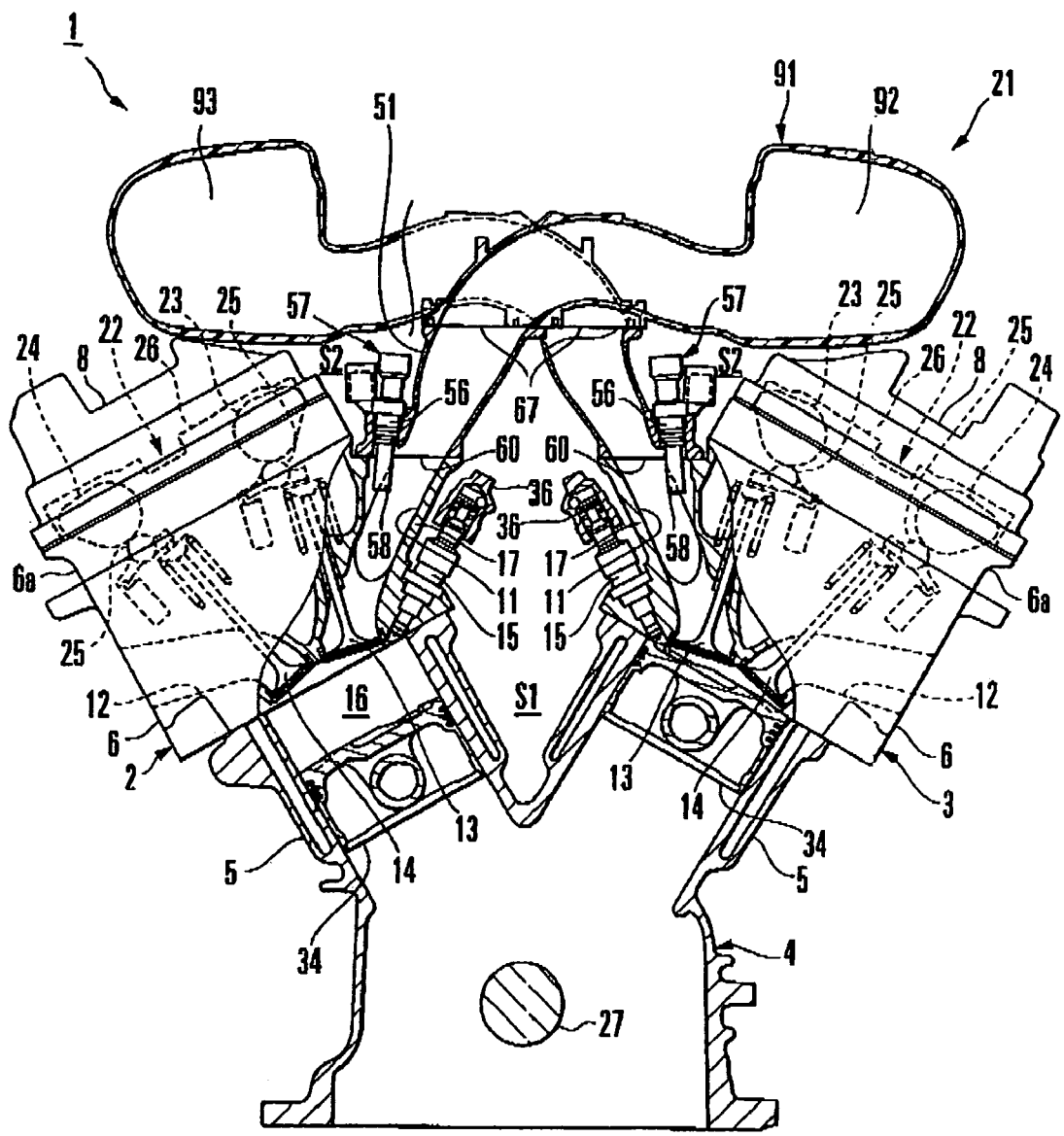
FIG. 9 is a view showing another embodiment.
Figure 10:
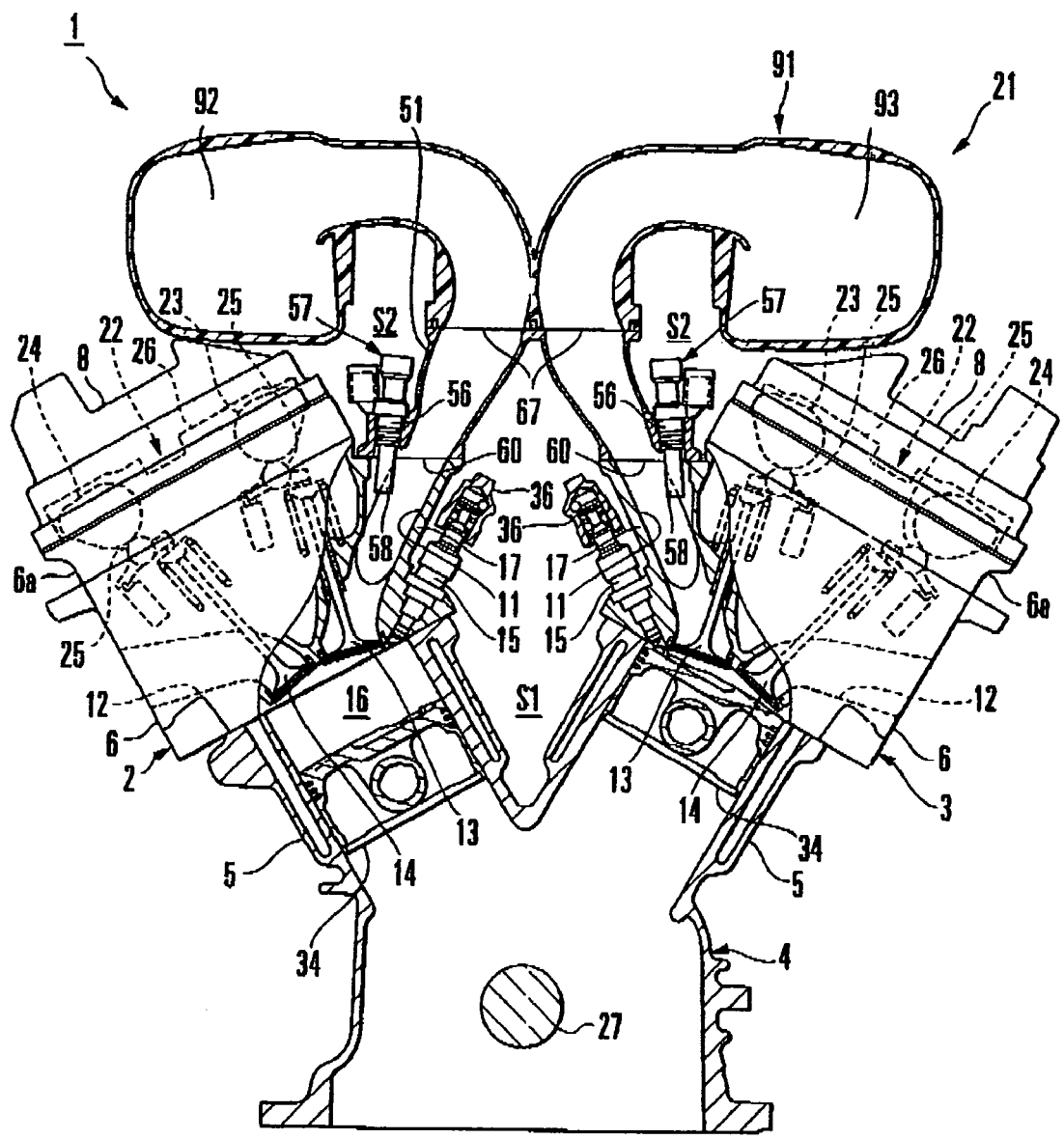
FIG. 10 is a view showing still another embodiment.

An intake manifold can be formed as shown in FIG. 9 or 10.

FIGS. 9 and 10 show other embodiments. In FIGS. 9 and 10, the same or equivalent members as those described with reference to FIGS. 1 to 8 are denoted by the same reference numerals, and a detailed description thereof will be omitted as needed.

An intake manifold 21 shown in each of FIGS. 9 and 10 comprises a main intake manifold 91 having a structure different from that of the first embodiment, and is provided with surge tanks 92 and 93 for the respective cylinder rows. This will be described in detail. Of the main intake manifold 91 shown in FIG. 9, the surge tank 92 communicating with the intake passage of a first cylinder row 2 is located above a second cylinder row 3, and the surge tank 93 communicating with the intake passage of the second cylinder row 3 is located above the first cylinder row 2.

In the main intake manifold 91 shown in FIG. 10, the surge tank 92 communicating with the intake passage of a first cylinder row 2 is located above the first cylinder row 2, and the surge tank 93 communicating with the intake passage of a second cylinder row 3 is located above the second cylinder row 3.

The two surge tanks 92 and 93 provided for the respective cylinder rows communicate with each other at one end in the axial direction of a crank shaft 27 so as to intake air from a throttle vale (not shown) provided to the communicating portion. The two surge tanks 92 and 93 need not always communicate with each other, unlike in the above description, and throttle valves can be connected to the respective surge tanks.

The structure of providing the surge tanks 92 and 93 to the respective cylinder rows in this manner can also provide the same effect as that obtained in the first embodiment.

Third Embodiment

Figure 11:
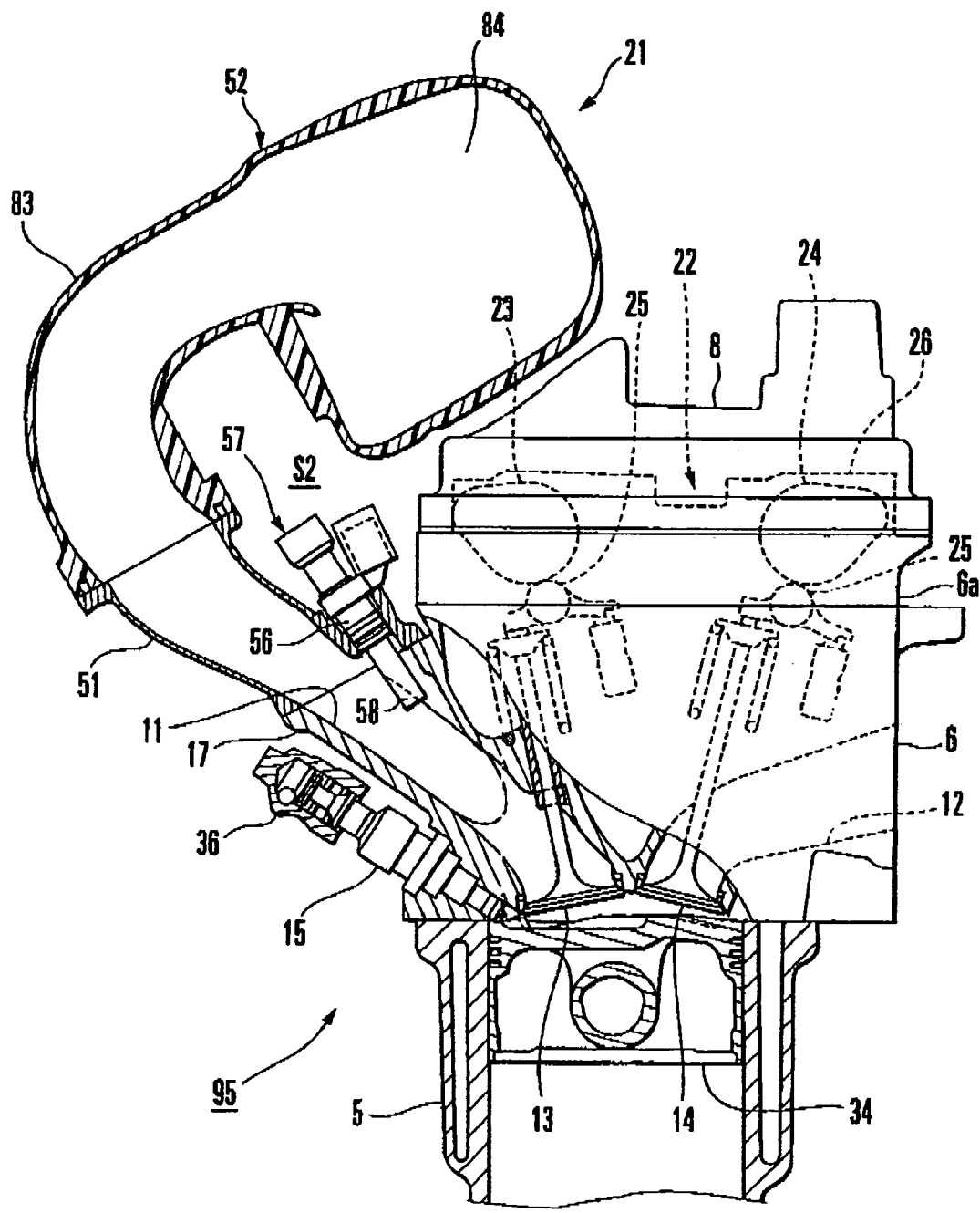
FIG. 11 is a view showing still another embodiment.

The present invention can also be applied to a multi-cylinder engine having only one cylinder row, as shown in FIG. 11.

FIG. 11 shows still another embodiment. In FIG. 11, the same or equivalent members as those described with reference to FIGS. 1 to 10 are denoted by the same reference numerals, and a detailed description thereof will be omitted as needed.

A dual-injector fuel injection engine 95 shown in FIG. 11 is an in-line multi-cylinder engine having only one cylinder row. This engine 95 has almost the same structure as that of the V-type multi-cylinder engine 1 shown in FIGS. 1 to 8 except that the number of cylinder rows is different. Thus, a sub-intake manifold 51 of an intake manifold 21 employed in the dual-injector fuel injection engine 95 of this embodiment is formed of only one side of the sub-intake manifold 51 shown in the first embodiment so as to be connected to intake ports 11 of one cylinder row. A main intake manifold 52 has a pipe-shaped portion 83 to be connected to the sub-intake manifold 51, and is provided with a surge tank 84 to be located above one cylinder row.

Even when the engine has a different shape in this manner, the same effect as that of the first embodiment can be obtained.

As described above, according to the present invention, the intake pipe injectors of the respective cylinders and the second delivery pipe to be connected to the intake pipe injectors can be mounted in the intake manifold so as to form one assembly.

Therefore, according to the present invention, as the operation of mounting the intake pipe injectors and second delivery pipe can be performed prior to mounting the intake manifold to the engine, the assembly operation can be facilitated. According to the present invention, the intake pipe injectors and second delivery pipe can be removed from the engine by removing the intake manifold from the engine. Thus, the intake pipe injector can be maintained easily.

The in-cylinder injectors and intake pipe injectors of the dual-injector fuel injection engine according to the present invention are located to be divided into the downstream side and upstream side of the intake ports and arranged to be distributed into the lower side and upper side across the intake port. Therefore, in this engine, the two types of injectors or delivery pipes do not interfere with each other. Thus, the two types of injectors and delivery pipes can be arranged in a narrow space, thus making the entire engine compact.

Therefore, according to the present invention, while the two types of injectors are mounted in the engine in a compact manner, the intake pipe injectors and delivery pipes can be mounted and maintained easily.

In addition, in the dual-injector fuel injection engine according to the present invention, the intake pipe injectors and second delivery pipes are supported by the intake manifold. Therefore, in this dual-injector fuel injection engine, inspection on fuel leakage from the intake pipe injectors and second delivery pipes can be performed prior to mounting the intake manifold on the engine. Namely, the engine does not interfere with the above inspection, so that the inspection can be facilitated.

In the engine according to the present invention, the intake pipe injectors and the second delivery pipes are supported by one intake manifold, as described above. Accordingly, the second delivery pipes can be aligned with the intake pipe injectors highly accurately. Therefore, according to the present invention, the fitting portions of the intake pipe injectors and the second delivery pipes can be aligned highly accurately, so fuel leakage from the fitting portion can be prevented reliably.

According to the present invention, the intake pipe injectors and the second delivery pipes are attached to the downstream portion of the intake manifold which is a relatively small component. Therefore, the assembly constituted by these members can be handled easily. Consequently, according to the present invention, attaching, maintenance, and fuel leakage inspection of the intake pipe injectors and second delivery pipes can be further facilitated.

According to the present invention, the intake pipe injectors can be attached to the intake manifold to be as low as possible. Hence, when the upstream portion of the intake manifold is to be arranged above the intake pipe injection injectors, the upstream portion can be positioned low.

As a result, in an automobile mounted with the engine according to the present invention, a sufficiently large gap can be reserved between an engine hood (bonnet) and the engine.

When the upstream portion of the intake manifold is to be arranged above the intake pipe injectors, the intake pipe injectors can be disposed in a space surrounded by the upstream and downstream portion of the intake manifold and the cylinder head to be away from these members. With this arrangement, when setting the attaching angles of the intake pipe injectors, the degrees of freedom in design increase. As a result, the fuel injecting directions of the intake pipe injectors can be set toward the valve bodies (canopies) of the intake valves.

According to the present invention, when the upstream portion of the intake manifold is to be arranged above the intake pipe injectors, it can be arranged at a low position while avoiding interference between the upstream portion and the second delivery pipes.

As a result, in an automobile mounted with the engine according to the present invention, a sufficiently large gap can be reserved between an engine hood and the engine.

According to the present invention, a long heat-insulating member can be used by using the space between the attaching seats and the low-pressure delivery pipes which are upwardly away from the attaching seats of the intake manifold by an amount corresponding to the length of each intake pipe injector. As a result, heat insulation of the portions where the second delivery pipes are attached to the cylinder head can be improved.

According to the present invention, the intake pipe injectors can be positioned at relatively low positions, and the distance between the intake pipe injectors and the valve bodies (valve faces) of the intake valves can be made short. Therefore, according to the present invention, the fuel injection ports of the intake pipe injectors can be formed to be directed toward the valve bodies of the intake valves. As a result, the area of that portion of the wall surface of the intake passage where the fuel injected from the injectors attaches can be decreased.

Also, when compared to a case wherein the fuel injecting portions of the intake pipe injectors are located on a side closer to the surge tank than the mating surface of the intake manifold and cylinder head, the attaching seats formed in the intake manifold for the intake pipe injectors can be formed thinner.

According to the present invention, all the intake pipe injectors and second delivery pipes of the V-type multi-cylinder engine can be supported by one component.

Therefore, according to the present invention, the plurality of intake pipe injectors and second delivery pipes can be mounted in the V-type multi-cylinder engine easily. In addition, the plurality of intake pipe injectors can be removed from the engine at once to perform maintenance.

According to the present invention, the two types of injectors and the first and second delivery pipes can be arranged in a compact manner between the two cylinder rows of the V-type engine. In addition, according to the present invention, as the upstream portion of the intake manifold can be set close to the intake pipe injectors, a V-type engine having a relatively small height can he provided.

According to the present invention, the intake pipe injectors can be arranged close to the intake manifold so as to extend along the intake passage. Hence, according to the present invention, the intake pipe injectors can inject the fuel toward the valve bodies (canopies) of the intake valves. Also, the area of that portion of the wall surface of the intake passage where the fuel attaches can be decreased.

According to the present invention, the connectors of the intake pipe injectors can be arranged beside the second delivery pipes so as not to largely project upward. Hence, according to the present invention, the upstream portion of the intake manifold can be arranged at a low position above the second delivery pipes.

According to the present invention, the attaching bolts to attach the second delivery pipes to the intake manifold and the attaching bolts to attach the intake to the cylinder head can be arranged in the dead space formed between the second delivery pipes and the side wall surface of the cylinder head. Thus, according to the present invention, when compared to a case wherein these bolts are located outside the second delivery pipes, the engine can be downsized in the widthwise direction.

Therefore, according to the present invention, a dual-injector fuel injection engine which has a relatively small height and a small width as a whole can be formed compact.

According to the present invention, the pulsation dampers can be attached to the lower portions of the second delivery pipes in a compact manner. Thus, according to the present invention, when the upstream portion of the intake manifold is to be arranged above the second delivery pipes, the position in the direction of height of the upstream portion is not limited by the pulsation dampers.

According to the present invention, the attaching seats which serve to attach the intake pipe injectors in the intake manifold can be made compact, so as to prevent the intake passage from being narrowed by the attaching seats. Hence, according to the present invention, the intake manifold can be formed such that the resistance occurring when the intake air flows through the intake passage of the intake manifold is decreased as much as possible.

The present invention can be used as an engine for a vehicle such as an automobile.

What is claimed is:

1. A dual-injector fuel injection engine comprising:
a cylinder block formed with a plurality of cylinder holes;
a cylinder head attached on said cylinder block;
an intake port formed in said cylinder head to extend from a combustion chamber obliquely upward with respect to an axis of each cylinder and serving as an intake passage for said each cylinder;
an intake manifold connected to said intake port at a downstream end thereof and including an intake passage branch for said each cylinder;
a surge tank provided upstream of said intake manifold and shared by a plurality of cylinders;
an in-cylinder injector provided to said each cylinder to inject fuel directly into said combustion chamber;
an intake pipe injector provided to said each cylinder to inject the fuel into said intake port;
a first delivery pipe connected to all in-cylinder injectors to supply the fuel thereto;
a second delivery pipe connected to all intake pipe injectors to supply the fuel thereto, wherein
said in-cylinder injector is positioned below said intake port, when seen from an axial direction of a crank shaft, and attached to said cylinder head, and
said intake pipe injector and said second delivery pipe being attached to said intake manifold to be close to said intake port on the opposite side of said in-cylinder injector with respect to said intake port, when seen from the axial direction of said crank shaft.

2. An engine according to claim 1, wherein said intake manifold is divisionally formed into
a downstream portion to which said intake pipe injector and said second delivery pipe are attached, and
an upstream portion including said surge tank.

3. An engine according to claim 1, wherein an attaching seat for said intake pipe injector is formed close to a mating surface where said intake manifold and said cylinder head mate.

4. An engine according to claim 3, wherein said second delivery pipe is fitted at upper end of said intake pipe injector and, when being attached, positioned lower than a mating surface where a downstream portion and upstream portion of said intake manifold mate.

5. An engine according to claim 1, wherein said second delivery pipe is attached, through a heat-insulating member, to an attaching seat formed close to a mating surface of said intake manifold with respect to said cylinder head.

6. An engine according to claim 1, wherein a fuel injecting portion of said intake pipe injector is formed to project closer to said cylinder head than a mating surface where said intake manifold and said cylinder head mate.

7. An engine according to claim 1, wherein a distance between fuel injection port of said intake pipe injector and a valve face center of an intake valve is 80 mm to 120 mm.

8. An engine according to claim 1, wherein
said engine comprises a V-type multi-cylinder engine, and
a downstream portion of said intake manifold which is provided to one cylinder row and a downstream portion of said intake manifold which is provided to the other cylinder row are formed integrally.

9. An engine according to claim 1, wherein
said engine comprises a V-type multi-cylinder engine and
said intake port, and said intake passage branch for said each cylinder of said intake manifold are located inside two cylinder rows which line up to form a V shape when seen from the axial direction of said crank shaft,
said in-cylinder injector is arranged in an inner space sandwiched by intake ports of said respective cylinder rows,
said intake pipe injector is arranged in a space sandwiched by said intake passage branch and an upper portion of each cylinder head, and
an upstream portion of said intake manifold is formed to extend across above said intake pipe injector of at least one cylinder row.

10. An engine according to claim 1, wherein
said second delivery pipe extends substantially flat in a direction perpendicular to the axial direction of said intake pipe injector and flexes such that a portion close to a side wall surface of said intake manifold and a portion away from said side wall surface alternate when seen from the axial direction of said intake pipe injector, and
upper ends of all intake pipe injectors are fitted with a lower surface of a portion of said second delivery pipe which is close to said side wall surface.

11. An engine according to claim 10, wherein
connectors of said intake pipe injectors are disposed in recesses formed in portions of said second delivery pipe which are close to said side wall surface of said intake manifold to be positioned on a side opposite to said side wall surface, so as to be positioned at substantially the same height, and
an attaching bolt which attaches said second delivery pipe to said intake manifold and an attaching bolt which attaches said intake manifold to said cylinder head are disposed in a recess which is formed in a portion of said second delivery pipe away from said side wall surface and opposes said side wall surface.

12. An engine according to claim 10, wherein
a pulsation damper is attached to a lower portion of said second delivery pipe from below, and
an upper portion of said second delivery pipe which opposes said pulsation damper projects upward.

13. An engine according to claim 1, wherein
said intake pipe injector is fitted in an attaching hole formed in said intake manifold, and
a fitting portion where said intake pipe injector fits with said intake manifold is sealed by an O-ring.

14. An engine according to claim 1, wherein said intake pipe injector is attached to said intake manifold adjacent to an upstream end of said intake port of said cylinder head.

15. An engine according to claim 14, wherein said intake pipe injector is attached to said intake manifold adjacent to a mating surface where said intake manifold and said cylinder head mate.

16. An engine according to claim 1, further comprising an attaching seat for said intake pipe injector, said attaching seat being formed in said intake manifold generally next to a mating surface where said intake manifold and said cylinder head mate.

17. An engine according to claim 1, wherein said first delivery pipe is fitted at the upper end portion of said in-cylinder injector, and positioned lower than the mating surface where said intake manifold and said cylinder head mate.

* * * * *

UNITED STATES PATENT AND TRADEMARK OFFICE
CERTIFICATE OF CORRECTION

PATENT NO.       : 7,296,558 B2
APPLICATION NO.  : 11/378115
DATED            : November 20, 2007
INVENTOR(S)      : Saeki et al.

It is certified that error appears in the above-identified patent and that said Letters Patent is hereby corrected as shown below:

Column 2, page 2, please add -- Co-pending U.S. Patent Application No. 11/086270, filed March 22, 2005, 'Fuel Supply System and Vehicle' -- under OTHER PUBLICATIONS.

Column 1, line 13 (approx.), delete "open" and insert -- Open --, therefore.

Column 2, line 25 (approx.), delete "feel" and insert -- fuel --, therefore.

Column 2, line 51 (approx.), delete "5:" and insert -- 5; --, therefore.

Column 7, lines 30-32 (approx.), delete "In this....................bolt 65a" and insert the same on Line 29 (approx.) after insulator 65. as a continuation of the paragraph.

Column 9, line 31, delete "embodiments" and insert -- embodiment, --, therefore.

Column 10, line 5, delete "car" and insert -- can --, therefore.

Column 10, line 37 (approx.), delete "car" and insert -- can --, therefore.

Column 13, line 61, delete "he" and insert -- be --, therefore.

Column 15, line 33, in Claim 9, delete "engine" and insert -- engine, --, therefore.

Signed and Sealed this

Twentieth Day of May, 2008

JON W. DUDAS
*Director of the United States Patent and Trademark Office*